UNITED STATES PATENT OFFICE.

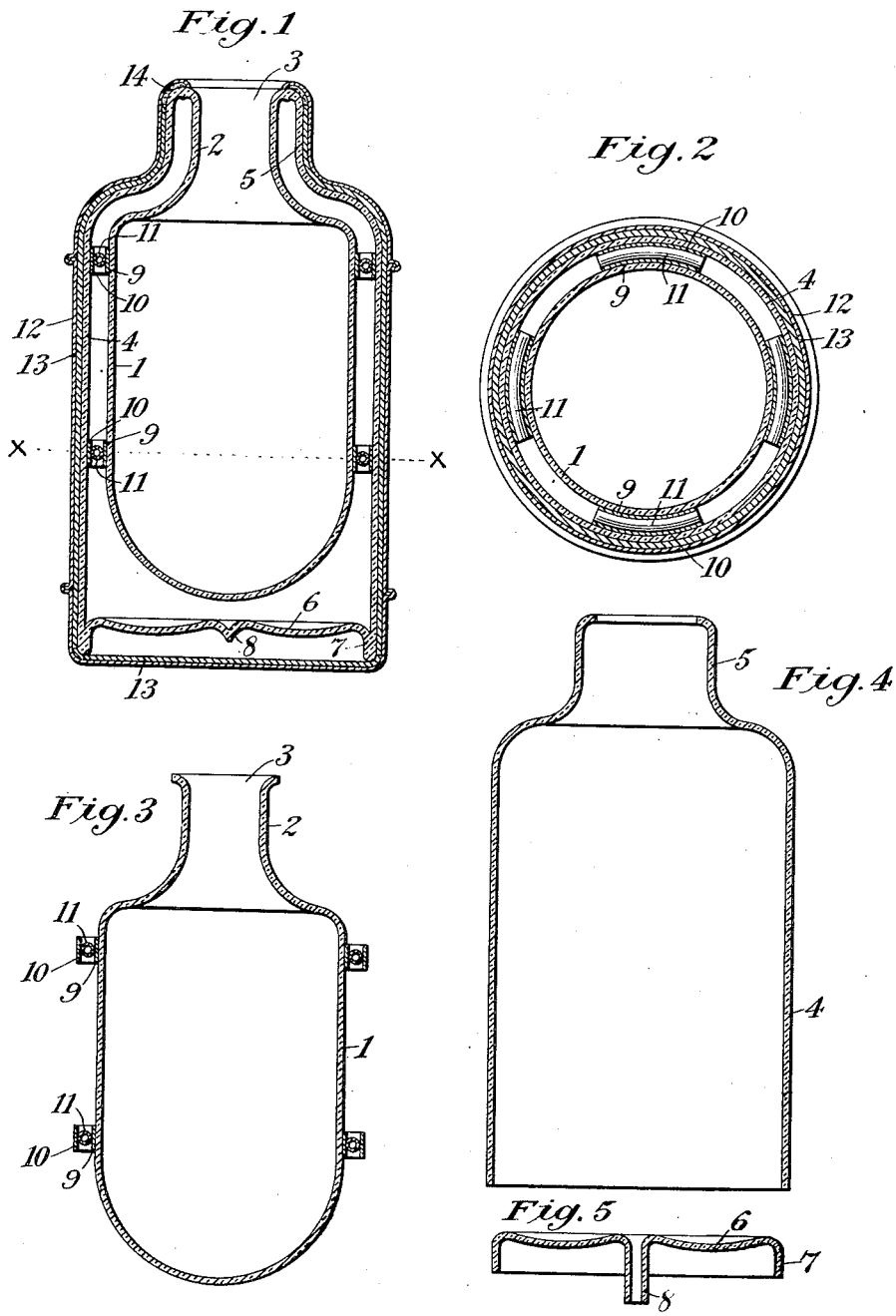

CLYDE J. COLEMAN, OF NEW YORK, N. Y., ASSIGNOR TO CONRAD HUBERT, OF NEW YORK, N. Y.

METHOD OF MAKING VACUUM-JACKETED VESSELS.

1,056,971. Specification of Letters Patent. Patented Mar. 25, 1913.

Application filed October 12, 1907. Serial No. 397,072.

*To all whom it may concern:*

Be it known that I, CLYDE J. COLEMAN, a citizen of the United States, residing in the borough of Manhattan, New York city, in the county of New York and State of New York, have invented a certain new and useful Improvement in Methods of Making Vacuum-Jacketed Vessels, of which the following is a specification; reference being had therein to the accompanying drawings, forming part thereof.

My invention relates to the method of manufacturing vessels for containing liquid food and beverages and for maintaining the same at a substantially even temperature, either hot or cold, for long periods of time. Such vessels are commonly used by touring parties, and the principal means of heat insulation in such vessels comprise a vacuum inclosed in the walls of the vessel and known as a "vacuum jacket."

The principal objects of my invention are simplicity and economy of construction, combined with efficiency of operation.
Other objects and advantages will be apparent from the following description.

As now carried on the manufacture of these vacuum jacketed vessels is difficult and expensive. First a bottle or inner receptacle of glass is inserted from the bottom into a glass casing open at the bottom and having a neck corresponding to the neck of the bottle, then the neck openings of the bottle and of the casing are fused together. When it comes to forming a bottom for the casing then the whole diameter and end of the lower portions of the casing are heated until soft and then turned or closed in and formed into a bottom for the casing below and spaced from the bottom of the bottle. This is a most difficult undertaking, requiring the highest skill, and even then with all precautions many breakages occur.

My invention includes the method involved in the forming of such a vessel of at least three separate and distinct parts, which are connected or joined together by fusing to form the vessel.

My invention will now be described with reference to the accompanying drawings, after which I will point out my invention in claims.

Figure 1 is a median vertical section of a complete vessel manufactured by the method of my invention. Fig. 2 is a transverse section on the line *x—x* of Fig. 1. Fig. 3 is a median vertical section of the inner blank or receptacle *per se* forming the inner part of the vessel before the parts of the vessel have been connected together. Fig. 4 is a median vertical section of the outer blank or upper part of the casing which forms a vacuum jacket around the inner receptacle. Fig. 5 is a median vertical section of the bottom blank or bottom part of the casing.

The vessel illustrated in the drawings comprises a glass inner receptacle or bottle having a cylindrical body portion 1 provided with a closed rounded bottom, as shown, and having a neck or constricted portion 2 terminating in a mouth 3. A two-part glass casing surrounds the inner bottle, and the two parts of the casing are fused together and fused to the bottle so as to form a vacuum jacket around the bottle. By making the casing in two separate and distinct parts these parts or blanks may be brought together in such a way as to inclose the bottle or inner blank to form the double wall vessel. It is perfectly evident that the casing could be made in more than two parts but only two parts are needed, unless the bottle to be inclosed should be of a very irregular and unusual shape. The casing for the bottle comprises an upper or top part or outer blank and a lower or bottom part or bottom blank. The outer blank or upper part of the casing has a cylindrical body portion 4, of larger diameter than the bottle, and a neck or reduced portion 5, of larger diameter than the neck of the bottle, and is open at both ends, the open bottom constituting a blank-receiving opening through which the bottle or inner blank may be inserted. The bottom blank or bottom part of the casing has a disk-shaped portion 6 and a downwardly depending flange portion 7, and is provided at the center with a downwardly or outwardly extending sealing tube or sealing teat 8. The diameter of the bottom blank or lower part of the casing is such that it will just fit into the body 4 of the outer blank or upper part of the casing. It will be noted that the depending flange 7 gives a generally concaved under surface to the bottom blank or bottom part of the casing.

In forming the vessel, first the three parts thereof or blanks, the bottle *per se* and the two parts of its casing, are separately molded or blown. Then the inner blank or bottle is inserted into the outer blank or top part of the casing from the bottom and the neck of the bottle at its mouth is sealed to the upper edge of the neck of the casing, the two parts being fused together, as indicated in Fig. 1.

In the larger sizes of vessels spacers should be inserted between the body 1 of the bottle and the cylindrical portion 4 of the casing, but in the smaller sizes of vessels these spacers or supports may be omitted. The spacers shown in the drawing comprise cushioning strips 9 and 10 which may be of asbestos paper, and between the strips 9 and 10 are heat-insulating bodies of rounded cross section shown as curved or arcuate glass tubes 11. The spacers are shown in the drawing as four in number, equally circumferentially disposed, and are arranged at two points longitudinally of the vessel, there being eight spacers or sections in all. The strips 9 and 10 are cemented or glued to the tubes 11, and the inner strips 9 are in like manner attached to the bottle body 1. This is done before the bottle or receptacle proper is inserted into the casing. After the inner blank or bottle has been inserted into the outer blank or upper part of the casing and connected thereto as above described, the bottom part of the bottom blank or casing is inserted into the bottom of the cylindrical body 4 of the upper part of the casing, until the flange 7 is flush with the edge of the body 4. Then the bottom or closure is sealed in place by fusing together the flange 7 and the contiguous portion of the body 4. This may be easily and conveniently done in an ordinary sealing machine. The appearance after sealing in the bottom is indicated in Fig. 1. As the inner bottle or receptacle and also the casing forming the vacuum jacket are of vitreous material, for example, glass, these parts may be readily connected together by fusing. The depending flange 7 coöperates with the lower portion or edge of the body 4 to provide for fusing together and sealing. The next step is to silver the inside of the vacuum jacket, to prevent the passage of radiant heat. The surfaces to be silvered comprise the outside of the bottle and the inside of its inclosing casing. The silvering is accomplished by introducing the silvering solution through the tube or teat 8. After the silvering has been completed, the air may be exhausted from the inclosing space or jacket through the aperture provided by the tube 8 and the tube sealed, as indicated in Fig. 1. The concavity of the bottom of the vessel provides substantial protection for the sealing tip 8, this tip when sealed being within the concavity of the bottom of the vessel (Fig. 1).

For providing further heat insulation and also and chiefly for protecting the glass vessel, the vessel comprising the bottle and its casing is provided with an outer jacket comprising a metal sheath 12 and a lining 13 therefor which may be of paper. The sheath 12 is made in a plurality of parts, shown as three, for convenience in assembling. The sheath 12 is curved inwardly and makes contact with the glass of the vessel at the mouth of the vessel, and beneath the sheath at this point is a ring 14 of cement, for making a tight joint between the metal of the sheath and the glass of the vessel.

It is obvious that various modifications may be made in the method hereinbefore particularly described within the principle and scope of my invention.

I claim:

1. The method of manufacturing hollow wall vessels of vitreous material which consists in, first, forming an inner blank with closed bottom and with a reduced opening at the top, an outer blank with open bottom and with a reduced opening at the top and a bottom blank adapted to close the bottom of the outer blank, second, inserting the inner blank in the outer blank and fusing these blanks together at their reduced openings, and, third, closing the bottom of the outer blank by fusing thereto the bottom blank.

2. The method of manufacturing hollow wall vessels of vitreous material which consists in, first, forming an inner blank with closed bottom and with a reduced opening at the top, an outer blank with open bottom and with a reduced opening at the top and a bottom blank adapted to close the bottom of the outer blank, second, inserting the inner blank in the outer blank and fusing these blanks together at their reduced openings, third, closing the bottom of the outer blank by fusing thereto the bottom blank, and, fourth, establishing and sealing off a vacuum between the inner blank and the outer blank and bottom blank.

3. The method of manufacturing hollow wall vessels of vitreous material which consists in, first, forming an inner blank with closed bottom and having a neck at the top, an outer blank with open bottom and having a neck at the top and a bottom blank having a downwardly depending marginal flange adapted to telescope into the bottom of the outer blank, second, inserting the inner blank neck first in the outer blank and fusing their necks together, and third, closing the bottom of the outer blank by inserting the bottom blank therein and fusing together the outer blank and the flange of the bottom blank.

4. The method of manufacturing hollow wall vessels of vitreous material which consists in, first, forming an inner blank with closed bottom and having a neck at the top, an outer blank with open bottom and having a neck at the top and a bottom blank having a downwardly depending marginal flange adapted to telescope into the bottom of the outer blank and provided with an exhaust aperture, second, inserting the inner blank neck first in the outer blank and fusing their necks together, third, closing the bottom of the outer blank by inserting the bottom blank therein and fusing together the outer blank and the flange of the bottom blank, and, fourth, establishing a substantial vacuum between the inner blank and the outer blank and bottom blank through the exhaust aperture and sealing the exhaust aperture.

5. The method of manufacturing hollow wall vessels of vitreous material which consists in, first, forming an inner blank with a closed bottom and having a neck at the top and a plurality of outer blanks, one of which has a neck and is also provided with an additional blank receiving opening, second, inserting the inner blank through the blank receiving opening in the outer blank and fusing their necks together, third, closing the blank receiving opening of the outer blank by fusing thereto another outer blank, and, fourth, establishing and sealing off a vacuum between the inner blank and the outer blanks.

6. The method of manufacturing hollow wall vessels of vitreous material which consists in, first, forming an inner blank with closed bottom and with a reduced opening at the top and a plurality of outer blanks, one of which is provided with a larger opening and with a reduced opening, second, inserting the inner blank through the larger opening in the outer blank and fusing these blanks together at their reduced openings, and, third, closing the larger opening of the outer blank by fusing thereto another outer blank.

7. The process of manufacturing hollow wall vessels of glass or similar material which consists in, first, forming an inner blank with closed bottom and a neck, an outer blank with open bottom and a neck and a bottom blank adapted to close said outer blank, second, inserting said inner blank in said outer blank and fusing their necks together, and, third, closing the bottom of said outer blank by fusing thereto said bottom blank.

8. The process of manufacturing hollow wall vessels of glass or similar material which consists in, first, forming an inner blank with closed bottom and a neck, an outer blank with open bottom and a neck and a bottom blank adapted to close said outer blank, second, inserting a said inner blank in said outer blank and fusing their necks together, third, closing the bottom of said outer blank by fusing thereto said bottom blank, and, fourth, establishing and sealing off a vacuum between said inner blank and said outer blank and bottom blank.

9. The process of manufacturing hollow wall vessels of glass or similar material which consists in, first, forming an inner blank with closed bottom and a neck, an outer blank with open bottom and a neck and a bottom blank adapted to close said outer blank, second, inserting said inner blank in said outer blank and fusing their necks together, and, third, closing the bottom of said outer blank by inserting said bottom blank therein and fusing said blanks together.

10. The process of manufacturing hollow wall vessels of glass or similar material which consists in, first, forming an inner blank with closed bottom and a neck, an outer blank with open bottom and a neck and a bottom blank adapted to close said outer blank, second, inserting said inner blank in said outer blank and fusing their necks together, third, closing the bottom of said outer blank by inserting said bottom blank therein and fusing said blanks together, and fourth, establishing and sealing off a vacuum between said inner blank and said outer blank and bottom blank.

11. The process of manufacturing hollow wall vessels of glass or similar material which consists in, first, forming an inner blank with closed bottom and a neck, an outer blank with open bottom and a neck and a bottom blank provided with an aperture and adapted to close said outer blank, second, inserting said inner blank in said outer blank and fusing their necks together, third, closing the bottom of said outer blank by inserting said bottom blank therein and fusing said blanks together, and, fourth, establishing a vacuum between said inner blank and said outer blank and bottom blank through said aperture and sealing off the same.

12. The process of manufacturing hollow wall vessels of glass or similar material which consists in, first, forming an inner blank with closed bottom and a neck, an outer blank with open bottom and a neck and a bottom blank provided with an aperture and adapted to close said outer blank, second, inserting said inner blank in said outer blank and fusing their necks together, third, closing the bottom of said outer blank by fusing the bottom blank thereto, and, fourth, establishing a vacuum between said inner blank and said outer blank and bottom blank through said aperture and sealing off the same.

13. The process of manufacturing hollow wall vessels of glass or similar material which consists of, first, forming an inner blank with closed bottom and a neck, an outer blank with open bottom and a neck and a bottom blank, having a concaved under face and an aperture through the body thereof, adapted to close said outer blank, second, inserting said inner blank in said outer blank and fusing their necks together, third, closing the bottom of said outer blank by inserting said bottom blank therein and fusing said blanks together, and, fourth, establishing a vacuum between said inner blank and said outer blank and bottom blank through said aperture and sealing off the same, said seal being within the concavity of said bottom blank.

In testimony whereof I affix my signature in presence of two witnesses.

CLYDE J. COLEMAN.

Witnesses:
WM. ASHLEY KELLY,
BERNARD COWEN.